United States Patent

Hamada et al.

[11] Patent Number: 6,089,649
[45] Date of Patent: Jul. 18, 2000

[54] OPENING AND CLOSING DEVICE FOR VEHICLE SLIDE DOOR

[75] Inventors: Yoshikazu Hamada; Mitsuhiro Watanabe; Hirofumi Watanabe, all of Yamanashi-ken, Japan

[73] Assignee: Mitsuo Kinzoku Kogyo Kabushiki Kaisha, Tokyo, Japan

[21] Appl. No.: 09/205,262

[22] Filed: Dec. 4, 1998

[30] Foreign Application Priority Data

Dec. 4, 1997 [JP] Japan ..................................... 9-350086

[51] Int. Cl.[7] .............................. B60J 5/06; E05F 15/14; E05F 11/54; E05C 3/06
[52] U.S. Cl. .............................. 296/155; 49/280; 49/360; 292/201
[58] Field of Search .............................. 296/155; 49/280, 49/360; 292/201, DIG. 46

[56] References Cited

U.S. PATENT DOCUMENTS 5,239,779  8/1993  DeLand et al. .

*Primary Examiner*—D. Glenn Dayoan
*Assistant Examiner*—Greg Blankenship
*Attorney, Agent, or Firm*—Browdy and Neimark

[57] ABSTRACT

An opening and closing device comprises a powered sliding unit, a powered closing unit in the slide door, a first terminal connected to a battery on the body, a second terminal connected to the closing unit, a handle switch provided in the door for detecting actuation of an open handle, a controller provided in the body for operating the sliding unit, a wireless apparatus for transmitting a radio signal to the controller when the switch detects the actuation of the handle. The second terminal electrically contacts with the first terminal when the door is closed. The device has a wire apparatus composed of a first wire line for connecting the first terminal and the controller, and a second wire line for connecting the second terminal and the handle switch. The controller operates the sliding unit to open the door when the controller recognizes actuation of the handle through only the wire apparatus or through both the wire apparatus and the wireless apparatus, and the controller operates the sliding unit to close the door when the controller recognizes actuation of the handle through only the wireless apparatus.

1 Claim, 4 Drawing Sheets

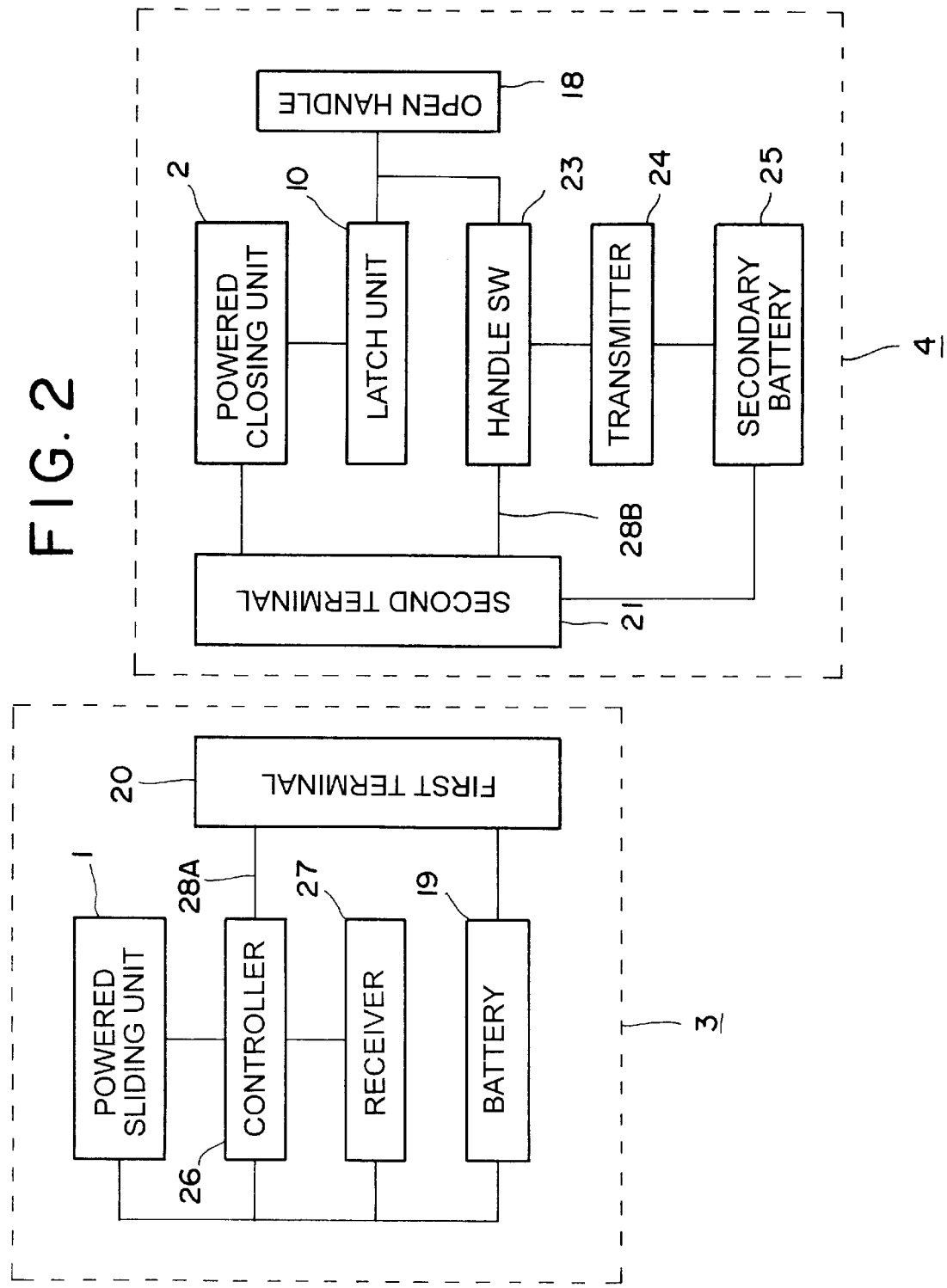

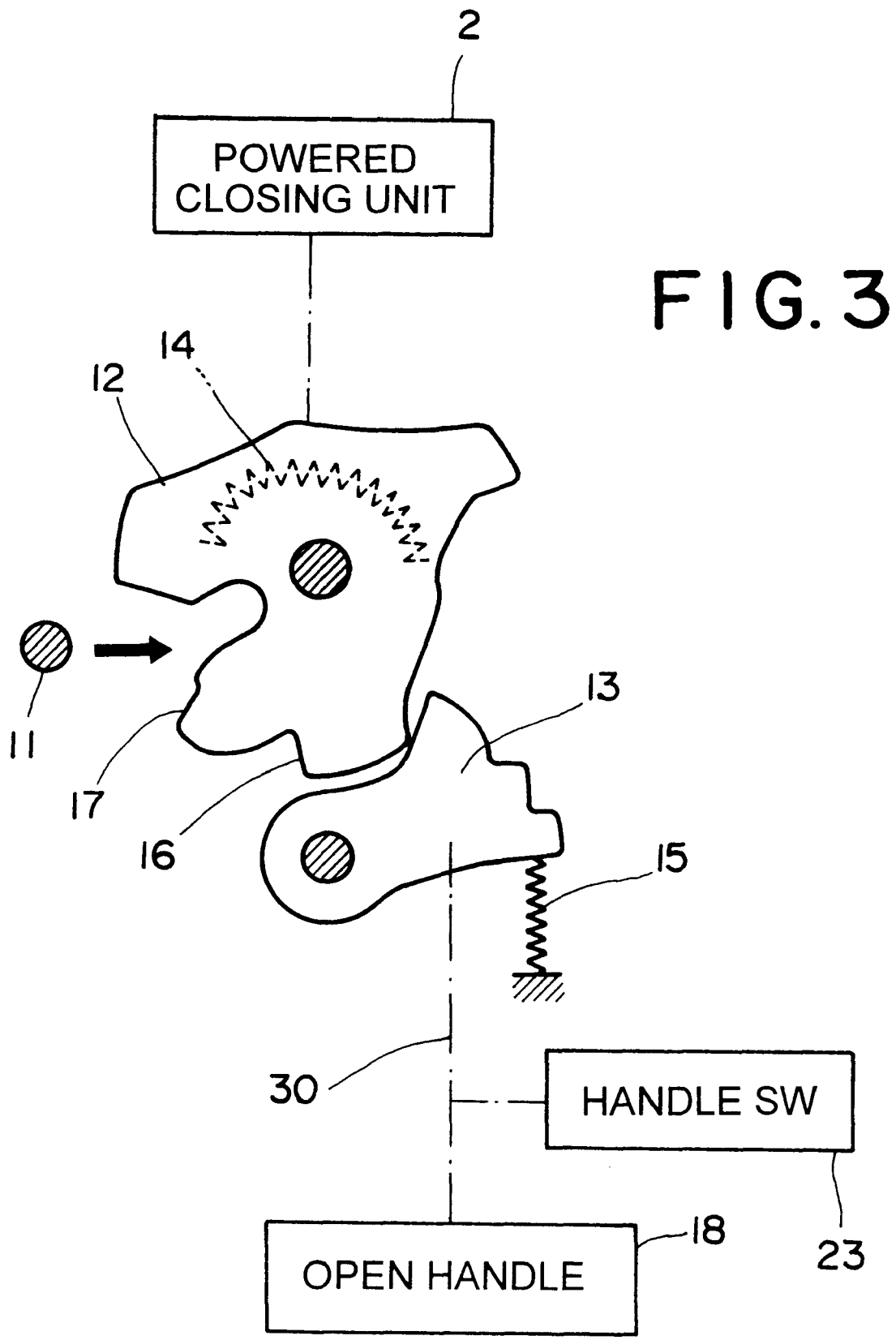

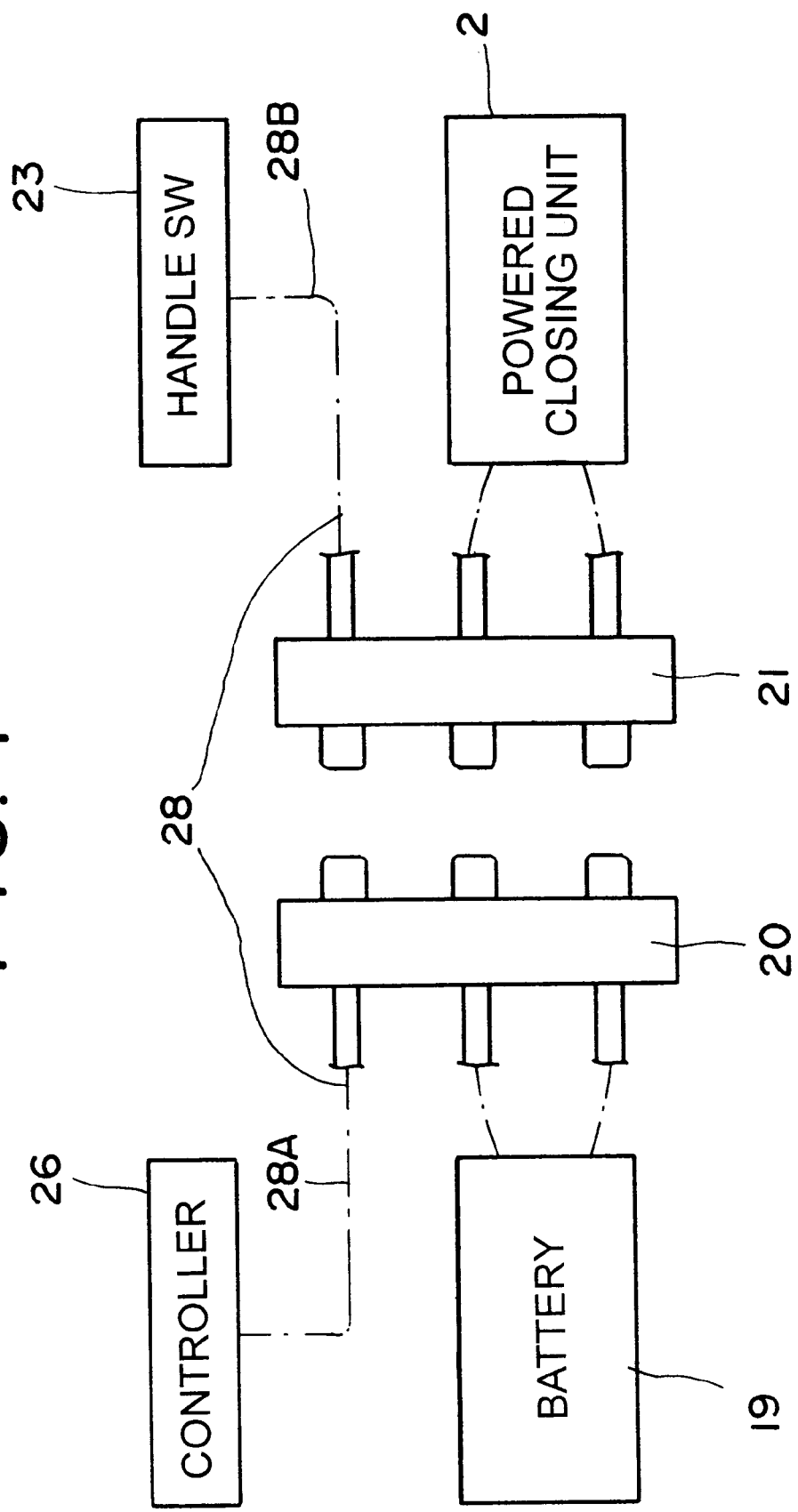

OPENING AND CLOSING DEVICE FOR VEHICLE SLIDE DOOR

BACKGROUND OF THE INVENTION

1. Field of the Invention

The present invention relates to an opening and closing device for a vehicle slide door, and in particular, to an opening and closing device which has an improved connecting means between a handle switch provided in a slide door and a controller provided in a vehicle body.

2. Description of the Prior Art

Conventionally, an opening and closing device for a vehicle slide door slidably attached to a vehicle body has been publicly known. The opening and closing device comprises a powered sliding unit provided in the vehicle body for moving the slide door in a closing direction or an opening direction by means of a first motor, a powered closing unit provided in the slide door for moving the slide door from a half-latched position to a full-latched position by means of a second motor, an open handle provided on the slide door, a handle switch provided in the slide door for detecting actuation of the open handle, and a control means provided in the vehicle body for operating the powered sliding unit on the basis of a detection signal of the handle switch.

The problem with the above device is in that durability and reliability in a connecting means for transmitting the detection signal of the handle switch of the slide door to the control means of the vehicle body are low. The typical connecting means is composed of a wired signal line interposed between the slide door and the vehicle body, or a contact terminal such as pantograph. However, these signal line and contact terminal have a problem of disconnection and contact failure.

U.S. Pat. No. 5,239,779 has disclosed an opening and closing device for a vehicle slide door slidably attached to a vehicle body which comprises a powered sliding unit (235) provided in the vehicle body for moving the slide door in a closing direction or an opening direction by means of a first motor, a powered closing unit (80) provided in the vehicle body for moving the slide door from a half-latched position to a full-latched position by means of a second motor (see column 14, lines 39 to 54), a powered locking unit (4M) provided in the slide door for locking or unlocking the slide door (see column 18, lines 14 to 32), a secondary battery (544) provided in the slide door for supplying an electric power to the powered locking unit (4M), a first terminal (552) provided in the vehicle body and electrically connected to a main battery on the vehicle body, and a second terminal (550) provided in the slide door and electrically connected to the secondary battery (544). The second terminal (550) is brought into contact with the first terminal (552) so as to electrically connect the battery and the secondary battery (544) when the slide door is fully closed. The opening and closing device further comprises an open handle (50) provided on the slide door, a handle switch (5LS) provided in the slide door for detecting actuation of the open handle (see column 33, lines 55 to 60), a control means (532) provided in the vehicle body for operating the powered sliding unit (235), and a connecting means for transmitting a radio signal to the control means (532) when the handle switch (5LS) detects the actuation of the open handle (50). The connecting means has a transmitter (518) provided in the slide door and a receiver (516) provided in the vehicle body. The control means (532) operates the powered sliding unit (235) when it recognizes the actuation of the open handle via the connecting means.

The latter device has no problem of disconnection and contact failure as the former device, because it has no wired connecting means. However, the wireless connecting means and the control means (532) of the latter device requires many components and a complicate circuit in order to distinguish whether a signal from the handle switch (5LS) is an instruction (command) for opening the slide door, or an instruction for closing the slide door.

OBJECT AND SUMMARY OF THE INVENTION

An object of the present invention is to provide an opening and closing device for a vehicle slide door which has an improved connecting means between a handle switch and a control means. The improved connecting means substantially has no problem of disconnection or contact failure, and does not require many components and a complicate circuit.

BRIEF DESCRIPTION OF THE DRAWINGS

FIG. 2 is a block diagram showing a circuit configuration of the opening and closing device;

FIG. 3 is a view schematically showing a latch unit of the opening and closing device; and FIG. 4 is a view showing a connecting means of the opening and closing device.

DETAILED DESCRIPTION OF THE PREFERRED EMBODIMENTS

Figure 1:
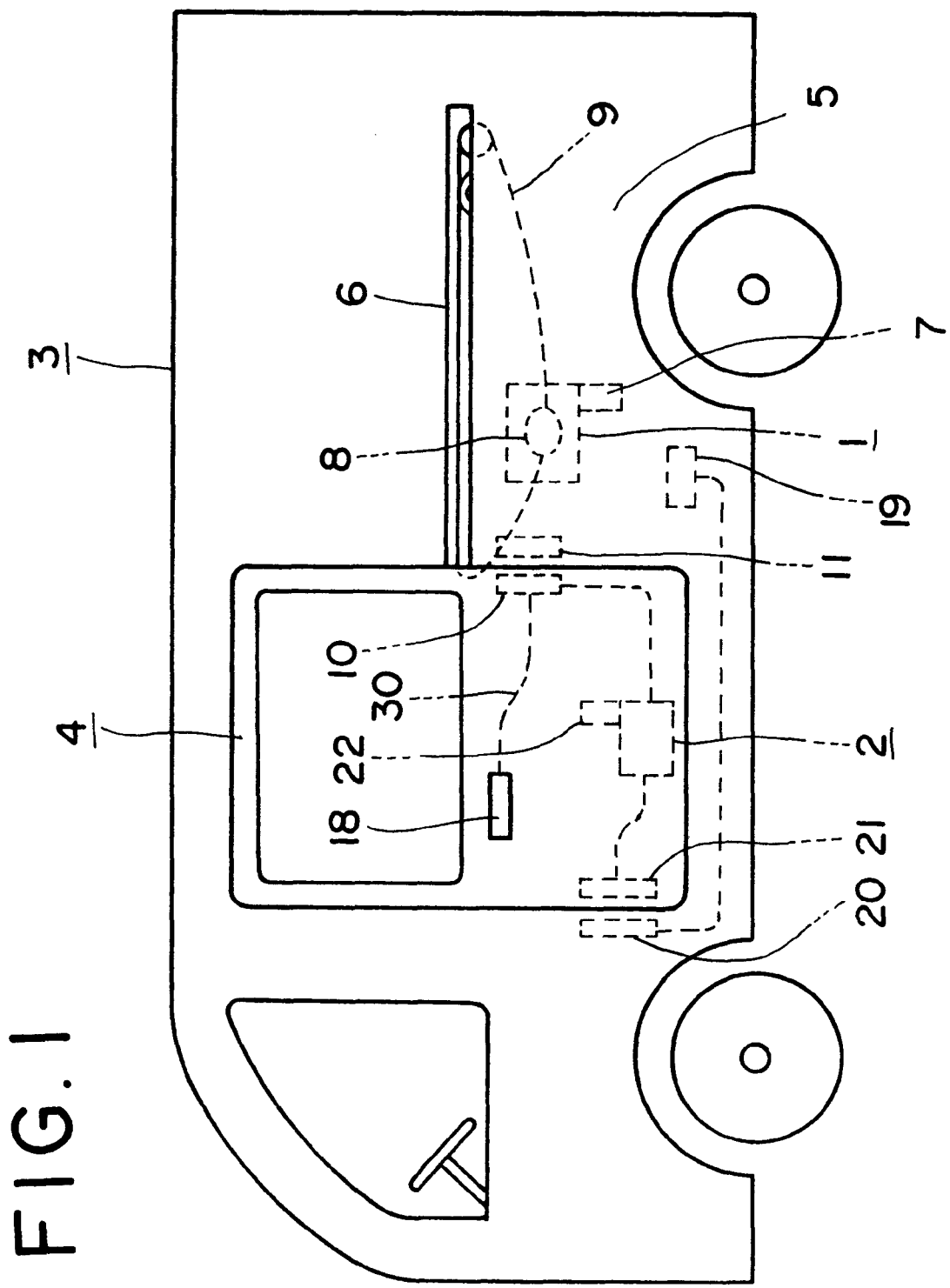
FIG. 1 is a side view showing a vehicle provided with an opening and closing device according to the present invention.

One embodiment of the present invention will be described below with reference to the accompanying drawings. FIG. 1 shows a side of a vehicle provided with a powered sliding unit 1 and a powered closing unit 2. The vehicle has a vehicle body 3 and a slide door 4 which is slidably attached to the vehicle body 3. The slide door 4 slides along a guide rail 6 attached to a quarter panel 5 of the vehicle body 3.

The powered sliding unit 1 is provided in a space inside the quarter panel 5, and has a wire drum 8 which is rotated by a power of a motor 7. The wire drum 8 is connected to the slide door 4 through a wire cable 9 so that the slide door 4 is moved in an opening direction or a closing direction by an opening or closing rotation of the drum 8.

The slide door 4 is provided with a latch unit 10 for keeping the door 4 in a door-closed state. The latch unit 10 has, as shown in FIGS. 1 and 3, a latch 12 which is engageable with a striker 11 fixed to the vehicle body 3, and a ratchet 13 which is engageable with the latch 12. The latch 12 is urged in a clockwise direction by an elastic force of a latch spring 14, and the ratchet 13 is urged in a counterclockwise direction by an elastic force of a ratchet spring 15. When the slide door 4 is moved in the closing direction, the latch 12 is abutted against the striker 11 and is rotated from an unlatched position as shown in FIG. 3 to a full-latched position where the ratchet 13 is engaged with a full-latched step 17 of the latch 12 via a half-latched position where the ratchet 13 is engaged with a half-latched step 16 of the latch 12. When the latch 12 reaches the half-latched position, the slide door 4 is initially closed, and when the latch 12 reaches the full-latched position, the slide door 4 is fully closed. The sliding unit 1 slides the door 4 in the closing direction until the latch 12 reaches the half-latched position. The ratchet 13 is connected to an open handle 18 of the slide door 4 through a mechanical linkage 30 so that the ratchet 13 is separated from the latch 12 by an actuation of the open handle 18.

The vehicle body 3 is provided with a first terminal or body side terminal 20 which is electrically connected to a main battery 19 on the vehicle body 3. The slide door 4 is provided with a second terminal or door side terminal 21 which is physically and electrically brought into contact with the first terminal 20 when the slide door 4 is slid in the closing direction as far as a terminal contact point before the latch 12 reaches the half-latched position, and which is separated from the first terminal 20 when the slide door 4 is slid in the opening direction from the terminal contact point.

The powered closing unit 2 which is provided in the slide door 4 is electrically connected to the second terminal 21 so that a power from the battery 19 is supplied to the powered closing unit 2 via a mutual contact of the terminals 20 and 21. The powered closing unit 2 rotates the latch 12 from the half-latched position to the full-latched position, using a power of a motor 22 thereof.

As shown in FIGS. 2 and 3, the slide door 4 has a handle switch 23 which is connected to the mechanical linkage 30 provided between the ratchet 13 and the open handle 18 in order to detect the opening actuation of the open handle 18, a transmitter 24 which transmits a radio signal when the handle switch 23 detects the opening actuation of the handle 18, and a secondary battery 25 for supplying an electric power to the transmitter 24. The secondary battery 25 is charged by an electric power of the battery while the first terminal 20 and the second terminal 21 contact with each other. The vehicle body 3 has a controller 26 which operates the powered sliding unit 1, and a receiver 27 which receives the radio signal from the transmitter 24. The transmitter 24 and the receiver 27 compose a wireless means as one of connecting means of the present invention between the handle switch 23 and the controller 26.

As shown in FIG. 4, a wire signal path 28 is provided between the handle switch 23 and the controller 26. The wire signal path 28 is composed of a body side wire signal line 28A for connecting the controller 26 and the first terminal 20, and a door side wire signal line 28B for connecting the handle switch 23 and the second terminal 21. The wire signal path 28 electrically connects the handle switch 23 and the controller 26 via the mutual contact of the terminals 20 and 21. The signal lines 28A, 28B and the terminals 20, 21 compose a wire means as the other of the connecting means of the present invention between the handle switch 23 and the controller 26.

OPERATION

When rotating the open handle 18 in the door-closed state, the rotation of the open handle 18 is detected by means of the handle switch 23, and the detection signal of the handle switch 23 is then transmitted to the controller 26 via the wire signal path or wire means 28 which is established or completed by a mutual contact of the first and second terminals 20 and 21. Simultaneously, the detection signal of the handle switch 23 is also transmitted to the controller 26 by means of the wireless means composed of the transmitter 24 and the receiver 27. At the same time the ratchet 13 is separated from the full-latched step 17 of the latch 12 by the actuation of the handle 18 through the linkage 30 to release an engagement of the latch unit 10 and the striker 11. In this way, when the controller 26 receives the detection signal from the switch 23 via both wireless and wire means, the controller 26 anticipates that the slide door 4 is in the closed state, thereby rotates the motor 7 of the powered sliding unit 1 in the opening direction so as to slide the door 4 in the opening direction. Or, when the controller 26 receives the detection signal via the wire means, the controller 26 rotates the motor 7 of the powered sliding unit 1 in the opening direction, neglecting the detection signal via the wireless means.

In the door-open state, that is, in a state that the first terminal 20 and the second terminal 21 do not contact with each other, the wire signal path (wire means) 28 is not completed. Therefore, in the open state, when the rotation of the open handle 18 is detected by means of the handle switch 23, the detection signal is only transmitted as a radio signal to the controller 26 through the wireless means. In this way, when the detection signal is transmitted to the controller 26 via only the wireless means, the controller 26 anticipates that the slide door 4 is in the open state, thereby rotates the motor 7 of the powered sliding unit 1 in the closing direction so as to slide the door 4 in the closing direction.

By the closing rotation of the motor 7, when the slide door 4 reaches the terminal contact point, the first terminal 20 and the second terminal 21 physically and electrically contact with each other, thereby a power from the battery 19 is supplied to the powered closing unit 2. Thereafter the latch 12 is abutted against the striker 11 due to further closing movement of the door 4, and is rotated to the half-latched position from the unlatched position, thereby the ratchet 13 is engaged with the half-latched step 16 of the latch 12. Then, the controller 26 stops the operation of the powered sliding unit 1, and operates the powered closing unit 2 so that the latch 12 is rotated from the half-latched position to the full-latched position, thereby, the slide door 2 is fully closed. Thereafter, the controller 26 stops the operation of the powered closing unit 2.

As mentioned above, in the present invention, the wire signal line 28A and the wire signal line 28B of the wire means 28 are electrically connected to each other via the terminals 20 and 21 which are provided in the vehicle body 3 and the door 4, respectively, in order to electrically connect the battery 19 and the powered closing unit 2. Therefore, it is not necessary to provide another connecting means for connecting the signal line 28A and the signal line 28B.

Further, in the present invention, since the controller 26 anticipates a signal inputted via the wire means 28 as a command for opening the slide door 4, the wireless means may merely transmit a simple signal to the controller 26 as a command for closing the slide door 4. Therefore, the wireless means of the present invention does not require many components and a complicate circuit.

What is claimed is:

1. An opening and closing device on a vehicle slide door slidably attached to a vehicle body, comprising:

a latch rotatably attached to the slide door and engageable with a striker fixed to the vehicle body when the slide door is closed, said latch having an unlatched position where the latch is disengaged from the striker, a half-latched position where the latch is initially engaged with the striker, and a full-latched position where the latch is fully engaged with said striker;

a ratchet rotatably attached to the slide door and engageable with the latch for keeping the engagement between the latch and the striker;

a powered sliding unit provided in the vehicle body for moving the slide door in a closing direction or an opening direction by power of a first motor;

a powered closing unit provided in the slide door for rotating the latch from the half-latched position to the full-latched position by power of a second motor;

a first terminal provided in the vehicle body and electrically connected to a battery on the vehicle body;

a second terminal provided in the slide door and electrically connected to the powered closing unit, said second terminal being brought into contact with the first terminal so as to electrically connect the battery and the powered closing unit when the slide door is closed to a predetermined position;

an open handle provided in the slide door and operatively connected to the ratchet for releasing the ratchet from the latch when actuated;

a handle switch provided in the slide door for detecting actuation of the open handle;

a control means provided in the vehicle body for operating the powered sliding unit;

a wireless connecting means for transmitting a radio signal to the control means when the handle switch detects the actuation of the open handle, said wireless connecting means having a transmitter provided in the slide door and a receiver provided in the vehicle body;

a first wire signal line for electrically connecting the first terminal and the control means;

a second wire signal line for electrically connecting the second terminal and the handle switch; and wherein said first wire signal line and said second wire signal line form a wire connecting means for electrically connecting the handle switch and the control means when the first terminal and the second terminal are physically and electrically brought into contact with each other, and said wire connecting means transmits a wire signal to the control means when the handle switch detects the actuation of the open handle while the wire connecting means is established;

wherein said control means operates the powered sliding unit to move the slide door in the opening direction when the control means recognizes the actuation of the open handle through only the wire connecting means or through both the wire connecting means and the wireless connecting means, and said control means operates the powered sliding unit to move the slide door in the closing direction when the control means recognizes the actuation of the open handle through only the wireless connecting means.

* * * * *